April 24, 1951 T. C. REHM 2,550,600
INDICATING CIRCUIT
Filed Nov. 22, 1948
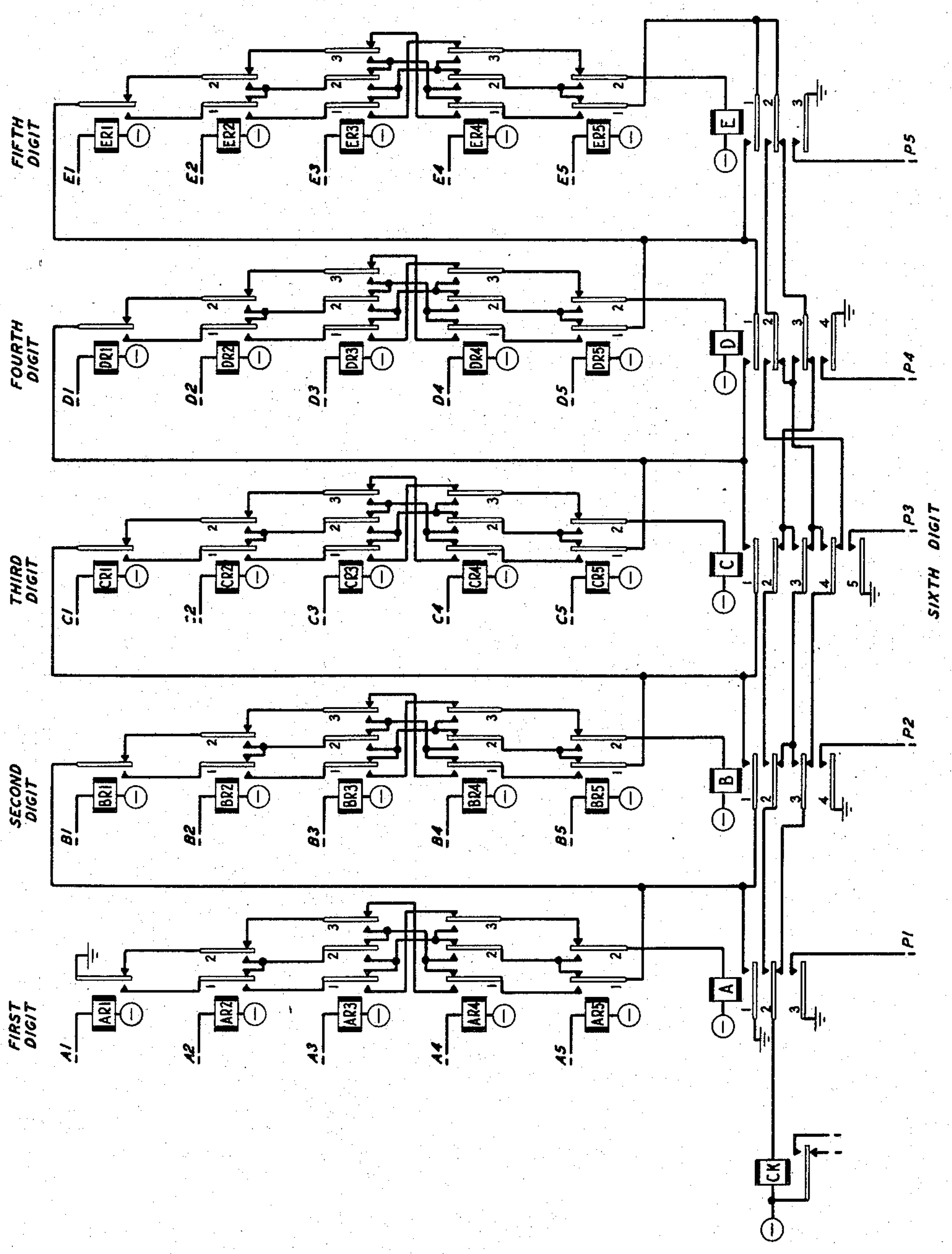
INVENTOR
T. C. REHM
BY
[signature]
ATTORNEY Patented Apr. 24, 1951 2,550,600

UNITED STATES PATENT OFFICE 2,550,600

INDICATING CIRCUIT

Theodore C. Rehm, Islip, N. Y., assignor to Bell Telephone Laboratories, Incorporated, New York, N. Y., a corporation of New York Application November 22, 1948, Serial No. 61,503

4 Claims. (Cl. 177—353)

This invention relates to indicating circuits and more particularly to circuits for indicating the number of conductors energized in a plurality of conductor groups.

In electrical registering, recording and intelligence-transmitting systems, it is common practice to indicate or transmit a series of digits or characters by energizing combinations of conductors in a group of conductors for each digit or character. A commonly used system is one in which there are five conductors in each group, energized in combinations of two conductors. In this way, any one of ten digits or characters may be indicated in each group.

The same result is attained by energizing combinations of three conductors. Systems in which any one of twenty digits or characters may be indicated in each group by energizing a combination of either two or three conductors are not generally used because of the impossibility of detecting false operation. If two conductors are energized in a group and a third conductor of the group is accidentally energized, or if three conductors are energized but one of them fails to produce the indicated response, a wrong character would be indicated and there is no way of determining that an error has been made. However, if a predetermined number of characters are transmitted by energizing three conductors for each, and the remainder of the characters are transmitted by energizing two conductors for each, a character is indicated in each group and an additional character is indicated by the combination of groups having three conductors energized in each. A system of this kind is shown in the copending application of C. Clos Serial No. 776,061 filed September 25, 1947, now Patent No. 2,470,145, dated May 17, 1949.

The present invention discloses a novel circuit for indicating, in systems of the kind described above, when the number and selection of the energized conductors is normal, and for thus detecting errors in the combinations of conductors energized.

The features of the invention will be apparent from the following description, the appended claims, and the drawing which shows the invention applied to a system having five groups of five conductors each.

Referring to the drawing, each of the conductors in the five groups of conductors A1 . . . A5, B1 . . . B5, C1 . . . C5, D1 . . . D5 and E1 . . . E5 is connected to the winding of one of the relays AR1 . . . AR5, BR1 . . . BR5, CR1 . . . CR5, DR1 . . . DR5, and ER1 . . . ER5, so that when any of said conductors are grounded, the associated relays are thereby operated. A combination of two relays operated in any group may have any desired significance. In the system contemplated herein, the operation of the remaining three relays of the group, has the same significance. For example, relays operated in the group AR1 . . . AR5 may signify digits as follows:

| Digit | Relays Operated | Relays Operated |
|---|---|---|
| 1 | AR1, AR2 | AR3, AR4, AR5 |
| 2 | AR1, AR3 | AR2, AR4, AR5 |
| 3 | AR2, AR3 | AR1, AR4, AR5 |
| 4 | AR1, AR4 | AR2, AR3, AR5 |
| 5 | AR2, AR4 | AR1, AR3, AR5 |
| 6 | AR3, AR4 | AR1, AR2, AR5 |
| 7 | AR1, AR5 | AR2, AR3, AR4 |
| 8 | AR2, AR5 | AR1, AR3, AR4 |
| 9 | AR3, AR5 | AR1, AR2, AR4 |
| 0 | AR4, AR5 | AR1, AR2, AR3 |

The significance of the relays operated in the other groups may be the same as in the first group described above. The relays AR1 . . . AR5, BR1 . . . BR5, CR1 . . . CB5, DR1 . . . DR5, and ER1 . . . ER5, may, of course, be provided with additional armatures to control registering, recording, indicating, or other similar devices or to give visual indication of their operation.

The grounding of a combination of two of the conductors P1 . . . P5 may also have any desired significance, which may be similar to the significance of the grounding of two conductors in any of the groups A1 . . . A5, B1 . . . B5, C1 . . . C5, D1 . . . D5, and E1 . . . E5, as described above and as follows:

| Digit | Conductors Grounded |
|---|---|
| 1 | P1, P2 |
| 2 | P1, P3 |
| 3 | P2, P3 |
| 4 | P1, P4 |
| 5 | P2, P4 |
| 6 | P3, P4 |
| 7 | P1, P5 |
| 8 | P2, P5 |
| 9 | P3, P5 |
| 0 | P4, P5 |

Conductors P1 . . . P5 may each be connected to a relay or other device responsive to ground thereon for indicating the conductors grounded or for any desired purpose.

To indicate six digits by means of the circuit shown on the drawing the appropriate two of the conductors in each of three of the groups A1 . . . A5, B1 . . . B5, C1 . . . C5, D1 . . . D5, and E1 . . . E5 should be grounded by any suitable means, and the appropriate three of the conductors in the remaining two groups also similarly grounded. The circuit then operates to complete the circuit of two of the five relays A—E which operate to express the "6th" digit by grounding two of the conductors P1—P5 in accordance with which of the two relays A—E have been operated. For example, to indicate the digits "123456," conductors A1, A2, B1, B3, E2 and E4 and conductors C1, C4, C5, D2, D3, and D5 should be grounded. The corresponding relays AR1, AR2, BR1, BR3, CR1, CR4, CR5, DR2, DR3, DR5, ER2, and ER4 then operate over obvious circuits. Operation of relays AR1 and AR2 indicates the digit "1," operation of relays BR1 and BR3 indicates the digit "2," operation of relays CR1, CR4 and CR5 indicates the digit "3," operation of relays DR2, DR3 and DR5 indicates the digit "4," and operation of relays ER2 and ER4 indicates the digit "5," in accordance with the code given above. The sixth digit "6" is then indicated by conductors P3 and P4 which are energized by relays C and D, respectively, operated over the following circuits:

Relay C operates over a circuit extending from battery through the winding of said relay, No. 2 front contacts of relay CR5, No. 2 front contacts of relay CR4, No. 2 back contacts of relay CR3, No. 1 back contacts of relay CR2, front contacts of relay CR1, No. 1 back contacts of relay BR5, No. 2 back contacts of relay BR4, No. 2 front contacts of relay BR3, No. 1 back contacts of relay BR2, front contacts of relay BR1, No. 1 back contacts of relay AR5, No. 2 back contacts of relay AR4, No. 1 back contacts of relay AR3, No. 1 front contacts of relay AR2, and front contacts of relay AR1 to ground. Relay D operates over a circuit extending from battery through the winding of said relay, No. 2 front contacts of relay DR5, No. 2 back contacts of relay DR4, No. 2 front contacts of relay DR3, No. 2 front contacts of relay DR2, back contacts of relay DR1, No. 1 contacts of Relay C, No. 1 back contacts of relay BR5 and thence, over the circuit traced above, to ground. By the closure of the No. 5 contacts of relay C and the No. 4 contacts of relay D, respectively, conductors P3 and P4 are grounded, indicating the digit "6" according to the code given above.

Relay CK also operates over a circuit extending from battery through the winding of said relay, No. 2 back contacts of relay A, No. 3 back contacts of relay B, No. 4 front contacts of relay C, No. 3 front contacts of relay D, No. 2 back contacts of relay E, No. 1 back contacts of relay ER5, No. 2 front contacts of relay ER4, No. 2 back contacts of relay ER3, No. 2 front contacts of relay ER2, back contacts of relay ER1, No. 1 contacts of relay D, No. 1 contacts of relay C, and thence over the circuit traced above for relay C, to ground, indicating that a normal number and selection of the conductors A1 . . . A5, B1 . . . B5, C1 . . . C5, D1 . . . D5, and E1 . . . E5 are grounded. The contacts of relay CK may be used to control an indicator or other device.

It will be observed that the fifth digit "5" could have been indicated by grounding conductors E1, E3 and E5 instead of by grounding conductors E2 and E4. Had this been done, however, relays ER1, ER3 and ER5 would have operated over obvious circuits and relay E would operate over a circuit extending from battery through the winding of said relay, No. 2 front contacts of relay ER5, No. 2 back contacts of relay ER4, No. 2 front contacts of relay ER3, No. 1 back contacts of relay ER2, front contacts of relay ER1, No. 1 contacts of relay D, No. 1 contacts of relay C and thence, over the circuit traced above for the operation of relay C to ground. Conductor P5 would then be grounded by No. 3 contacts of relay E giving a false indication of the sixth digit. However, relay CK would not now operate, its circuit being open at No. 2 back contacts of relay E. Failure of relay CK to operate indicates that the conductors grounded in the groups A1 . . . A5, B1 . . . B5, C1 . . . C5, D1 . . . D5, and E1 . . . E5 are not normal. Similarly if three conductors are grounded in any three or more of said groups, relay CK will not operate.

If, in the above example, only one conductor, for example, conductor E1 were grounded in the group E1 . . . E5, relay ER1 would operate but relay E would not operate, its circuit, which may be traced from battery through the winding of said relay, No. 2 back contacts of relay ER5 and No. 3 back contacts of relay ER4 to No. 1 front contacts of relay ER3, being open at the latter contacts. Relay CK would then not operate, its circuit traced from No. 2 back contacts of relay E through No. 1 back contacts of relay ER5, No. 2 back contacts of relay ER4, and No. 1 back contacts of relay ER3 to No. 1 front contacts of relay ER2, being open at the latter contacts. Similarly, relay CK does not operate if only one conductor is grounded in any of the groups A1 . . . A5, B1 . . . B5, C1 . . . C5, D1 . . . D5, and E1 . . . E5. Failure of relay CK to operate indicates that the number of conductors grounded is not normal.

Furthermore, if more than three conductors are grounded in any of the groups A1 . . . A5, B1 . . . B5, C1 . . . C5, D1 . . . D5, and E1 . . . E5, for example, conductors E1, E2, E3 and E4, operating relays ER1, ER2, ER3 and ER4, relay E does not operate, its circuit traced from battery through the winding of said relay, No. 2 back contacts of relay ER5, No. 3 front contacts of relay ER4, No. 2 front contacts of relay ER3, and No. 2 front contacts of relay ER2 to back contacts of relay ER1, being open at the latter contacts. Relay CK does not then operate, its circuit which may be traced from No. 2 back contacts of relay E through No. 1 back contacts of Relay ER5, No. 2 front contacts of relay ER4 and No. 3 front contacts of relay ER3 to No. 2 back contacts of relay ER2, being open at the latter contacts. Relay CK operates only, therefore, when a normal number and selection of conductors in the groups A1 . . . A5, B1 . . . B5, C1 . . . C5, D1 . . . D5 and E1 . . . E5 are grounded.

Whenever, therefore, a combination of conductors A1 . . . A5, B1 . . . B5, C1 . . . C5, D1 . . . D5 and E1 . . . E5 is grounded to indicate six digits in accordance with the codes given, relay CK operates to indicate that said combination is normal and in accordance with said codes, but if for any reason, an improper number or selection of said conductors is grounded, relay CK does not operate.

While I have illustrated my invention in its application to a particular type of circuit, it is not limited to such application nor to the specific arrangements disclosed herein. It will be evident to one skilled in the art that many applications, arrangements, and modifications, other than those herein disclosed, are within the scope of the invention. The terms and expressions which I have used in reference to the invention and its elements are used as terms of description and not of limitation and I have no intention, by the use of said terms and expressions, of excluding thereby equivalents of the features shown and described or portions thereof but, on the contrary, intend to include therein any and all equivalents and modifications which may be employed without departing from the spirit of the invention.

What is claimed is:

1. An indicating circuit comprising in combination groups of conductors, one number of which is normally energized in a number of said groups and another number of which is normally energized in the remainder of said groups, and means for indicating when a normal number of conductors is energized in each of said groups.

2. An indicating circuit comprising in combination groups of conductors, one number of which is normally energized in a number of said groups and another number of which is normally energized in the remainder of said groups, means for indicating the conductors energized in each of said groups, and means for indicating when a normal number of conductors is energized in each of said groups.

3. An indicating circuit comprising in combination groups of conductors, one number of which is normally energized in a number of said groups and another number of which is normally energized in the remainder of said groups, means for indicating the number of conductors energized in each of said groups, means for indicating the groups in which said other number of conductors is energized, and means for indicating when a normal number of conductors is energized in each of said groups.

4. An indicating circuit comprising in combination groups of conductors, one number of which is normally energized in a number of said groups and another number of which is normally energized in the remainder of said groups, first relays each responsive to the energization of one of said conductors, second relays responsive to said first relays, and a relay responsive to said first and second relays for indicating when a normal number of conductors is energized in each of said groups.

THEODORE C. REHM.

REFERENCES CITED

The following references are of record in the file of this patent:

UNITED STATES PATENTS

| Number | Name | Date |
|---|---|---|
| 1,972,985 | Gardner | Sept. 11, 1934 |
| 2,451,319 | Candy et al. | Oct. 12, 1948 |
| 2,460,702 | Mallery | Feb. 1, 1949 |
| 2,468,112 | Rosen | Apr. 26, 1949 |